F. W. BAKER & J. S. FOLEY.
DETACHABLE RIM.
APPLICATION FILED JULY 24, 1916.
1,290,873.        Patented Jan. 14, 1919.
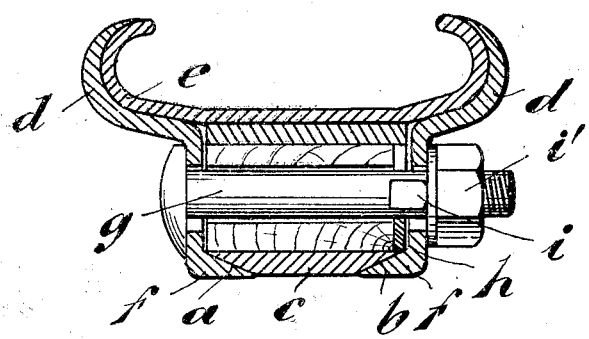
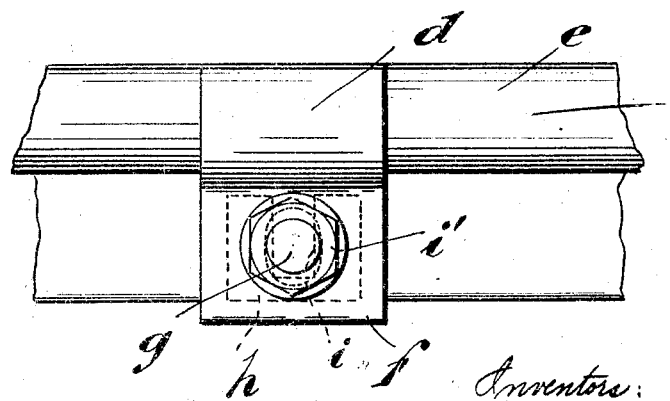

UNITED STATES PATENT OFFICE.

FREDERICK W. BAKER AND JAMES S. FOLEY, OF STOURBRIDGE, ENGLAND.

DETACHABLE RIM.

1,290,873.

Specification of Letters Patent.

Patented Jan. 14, 1919.

Application filed July 24, 1916. Serial No. 111,079.

*To all whom it may concern:*

Be it known that we, FREDERICK WILLIAM BAKER and JAMES SAMUEL FOLEY, subjects of the Kingdom of Great Britain, residing, respectively, at 59 Hagley road, Stourbridge, England, engineer, and 17 Beale street, Stourbridge, aforesaid, engineer, have invented certain Improvements in or Relating to Detachable Rims, of which the following is a specification.

This invention comprises certain improvements in or relating to detachable rims.

According to the present invention the detachable rim is coupled to the main rim or carrier part by means which when tightened tend to contract or draw inwardly the detachable rim, that is to say, the fastening elements between the detachable rim and the main wheel or carrier part are in effect operating in tension, this providing for a particularly effective coupling of the main and detachable members together.

Conveniently the connecting elements take the form of members furnished with hook parts adapted to embrace the sides of the detachable rim; the parts having these hook formations extend radially inwardly and in the vicinity of the main rim or carrier part or a suitable portion thereof the fastening means are furnished with inclined surfaces adapted to coöperate with corresponding inclined surfaces provided upon or in connection with the main carrier part so that when the fastening members are drawn together by suitable tightening means, that is in a direction transversely of the plane of the wheel, they are caused by virtue of the inclined surfaces to move radially inwardly, thereby effecting the desired inward effort by which the detachable rim is retained.

In order that this invention may be clearly understood and readily carried into practice, reference may be had to the appended explanatory sheet of drawings, upon which:—

Figure 1 is a transverse section of the rim of a wheel constructed according to the present invention.

Fig. 2 is a part side elevation of the rim shown in Fig. 1.

In a convenient embodiment of the present invention, as applied to an ordinary standard rim, we provide within the inner circular surface of the felly the two inclined surfaces $a$, $b$. These inclined surfaces $a$, $b$ may be provided upon plates $c$ suitably secured to the felly and provided at intervals around the circumference of the wheel. Fastening members are disposed one on each side of the felly; these fastening members each have outwardly a hook part $d$ to engage with the side of the detachable rim $e$ and inwardly an inturned inclined tongue $f$ conforming with the incline at the inner surface of the felly. Upon these two fastening members, one on each side, being drawn together by a clamping bolt $g$ or the like, the clamping bolt passing, for instance, through perforations in the fastening means and an axially disposed perforation in the felly having a radial enlargement, the result is to collectively draw the two fastening members radially inwardly while they are being clamped toward each other, and the result is not only an effective lateral clamping of the rim, but also an inwardly drawing effort upon the rim. To provide for this the hole or holes through which the bolt $g$ passes may in either or both of the felly and fastening members be enlarged or elongated radially of the wheel, this enlargement being shown in the hole in the felly. $h$ is a U-shaped plate for retaining the bolt normally in its position. The bolt is formed with flats or recesses $i$, one on each side, and the flattened portion is disposed between the two limbs of the U-shaped plate, which latter is retained in position by the plate $c$, and may also be secured by other means. The plate $h$ serves to prevent rotation of, and withdrawal of, the bolt $g$ and by tightening the nut $i'$ the desired drawing together of the fastening members is effected.

The bearing stress of the wheel is by this invention effectively taken by the connecting members when at the top of the wheel, these, as previously stated, operating in tension. The wheel rim is thus in suspension and a certain amount of elasticity is provided which is advantageous in the preservation of tires, and especially in preventing an undue stress on the felly with consequent splitting of felly. This results from the fact that the bolt is floating in the hole in the felly, due to the radial enlargment of the hole.

The connecting members may tend to flatten or indent very slightly the rim at the points at which they operate; by this means creeping is effectively prevented; slight clearance may occur between the parts of the main and detachable members throughout the circumferential parts intermediate to the connecting elements; this furthermore tends to obtain the desideratum of elasticity.

Any suitable mechanism may be provided for applying the radially inward effort to the detachable member, and any suitable locking means may be provided in connection with such mechanism.

The inner surface of the detachable rim may be flat and plain and the external surface of the felly which may be suitably banded as shown at $j$ may likewise be flat and plain, these two surfaces being forced into intimate contact by the radially inwardly drawing means.

With the present invention the detachable rim does not have to be placed in any particular way in relation to the main rim; this is of advantage in the case of twin detachable rims, as the twin rim can be removed and replaced in reverse relationship so that if one tire receives more wear than another, the wear can be transferred to the other tire.

My invention has been shown as applied to a plain undivided hooked rim, but those skilled in the art will readily see that it may be applied to other forms of rims without essential change.

What we claim as our invention and desire to secure by Letters Patent is:—

1. The combination with a main wheel or carrier part of a detachable rim, fastening members hooked to said rim and having wedging engagement with said wheel, and means for drawing the fastening members on either side of the rim toward each other, said members and said wedging means being free to move radially of the wheel as said members are drawn toward each other.

2. The combination with a detachable rim of a main wheel or carrier part, said wheel having a standard felly, provided with radially elongated apertures therein, clamping members having hooked engagement with said rim, a wedge plate on the inner face of said felly, said clamping members having wedging engagement with said plate, and a bolt for drawing said clamping members toward each other, said bolt floating in the apertures in said felly, whereby said clamping members and said bolt move radially as said clamping members are drawn toward each other.

In witness whereof we have hereunto set our hands in the presence of two witnesses.

FRED. W. BAKER.
J. S. FOLEY.

Witnesses:
ARTHUR H. BROWN,
HOLLIS BROWN.